(12) United States Patent
Bossmeyer et al.

(10) Patent No.: US 9,145,851 B2
(45) Date of Patent: Sep. 29, 2015

(54) METHOD FOR DIAGNOSING A LOW PRESSURE EXHAUST GAS RECIRCULATION SYSTEM OF AN INTERNAL COMBUSTION ENGINE AND DEVICE FOR CARRYING OUT THE METHOD

(71) Applicants: Thomas Bossmeyer, Korntal-Muenchingen (DE); Stefan Motz, Modugno (IT); Jens Pawlak, Stuttgart (DE)

(72) Inventors: Thomas Bossmeyer, Korntal-Muenchingen (DE); Stefan Motz, Modugno (IT); Jens Pawlak, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/156,955

(22) Filed: Jan. 16, 2014

(65) Prior Publication Data

US 2014/0196527 A1    Jul. 17, 2014

(30) Foreign Application Priority Data

Jan. 16, 2013 (DE) .......................... 10 2013 200 536

(51) Int. Cl.
*F02M 25/07* (2006.01)
*F02D 21/08* (2006.01)
(Continued)

(52) U.S. Cl.
CPC ........... *F02M 25/0702* (2013.01); *F02D 21/08* (2013.01); *F02D 41/0072* (2013.01); *F02D 41/18* (2013.01); *F02D 41/22* (2013.01); *Y02T 10/47* (2013.01)

(58) Field of Classification Search
CPC .. F02M 25/0702; F02M 25/071; Y02T 10/47; F02D 41/18; F02D 41/0065; F02D 41/0072; F02D 41/221; F02D 2041/1433
USPC ...................................................... 73/114.74
See application file for complete search history.

(56) References Cited

U.S. PATENT DOCUMENTS 7,367,188 B2 * 5/2008 Barbe et al. ................... 60/605.2
7,493,762 B2 * 2/2009 Barbe et al. ................... 60/605.2
(Continued)

FOREIGN PATENT DOCUMENTS

DE    198 04 330    8/1999
DE    101 58 250    6/2003
(Continued)

*Primary Examiner* — Freddie Kirkland, III
(74) *Attorney, Agent, or Firm* — Kenyon & Kenyon LLP

(57) ABSTRACT

A method and device for diagnosing a low pressure exhaust gas recirculation system (LPEGRS) of an internal combustion engine having an intake area for supplying fresh air which includes in succession in the flow direction a first section having a low pressure in which an air mass flow sensor is situated, a compressor and a second section having a high pressure, the engine exhaust area including a second section having a low exhaust gas pressure, and the LPEGRS which has an adjustable LPEGR valve recirculating at least a portion of the exhaust gas in the second section of the exhaust area to the first section of the intake area. The fresh air mass flow taken in is measured by the air mass flow sensor, the total mass flow flowing through the compressor being ascertained, the LPEGR mass flow being ascertained from the difference between the total mass flow and the fresh air mass flow taken in, an estimated value being calculated for the LPEGR mass flow, the difference between the ascertained LPEGR mass flow and the estimated value being formed, and an error signal being output for a deviation. The procedure is for detecting exhaust gas-relevant errors.

10 Claims, 1 Drawing Sheet

(51) Int. Cl.
*F02D 41/00* (2006.01)
*F02D 41/18* (2006.01)
*F02D 41/22* (2006.01)

(56) References Cited

U.S. PATENT DOCUMENTS

| | | | | |
|---|---|---|---|---|
| 8,042,528 | B2* | 10/2011 | Gates et al. | 123/568.21 |
| 8,616,186 | B2* | 12/2013 | Surnilla et al. | 123/568.11 |
| 8,630,787 | B2* | 1/2014 | Shutty et al. | 701/108 |
| 8,783,029 | B2* | 7/2014 | Vigild et al. | 60/605.2 |
| 8,904,787 | B2* | 12/2014 | Styles et al. | 60/605.2 |
| 2010/0101226 | A1* | 4/2010 | Shutty et al. | 60/602 |
| 2011/0010079 | A1* | 1/2011 | Shutty et al. | 701/108 |
| 2011/0088674 | A1* | 4/2011 | Shutty et al. | 123/568.21 |
| 2011/0162626 | A1* | 7/2011 | Styles et al. | 123/568.21 |
| 2011/0257952 | A1* | 10/2011 | Motz et al. | 703/9 |
| 2011/0283699 | A1* | 11/2011 | Surnilla et al. | 60/605.2 |

FOREIGN PATENT DOCUMENTS

| | | |
|---|---|---|
| DE | 10 2004 019 315 | 11/2005 |
| DE | 10 2008 040633 | 1/2010 |
| DE | 10 2010 027976 | 10/2011 |
| EP | 2 543 857 | 1/2013 |

* cited by examiner

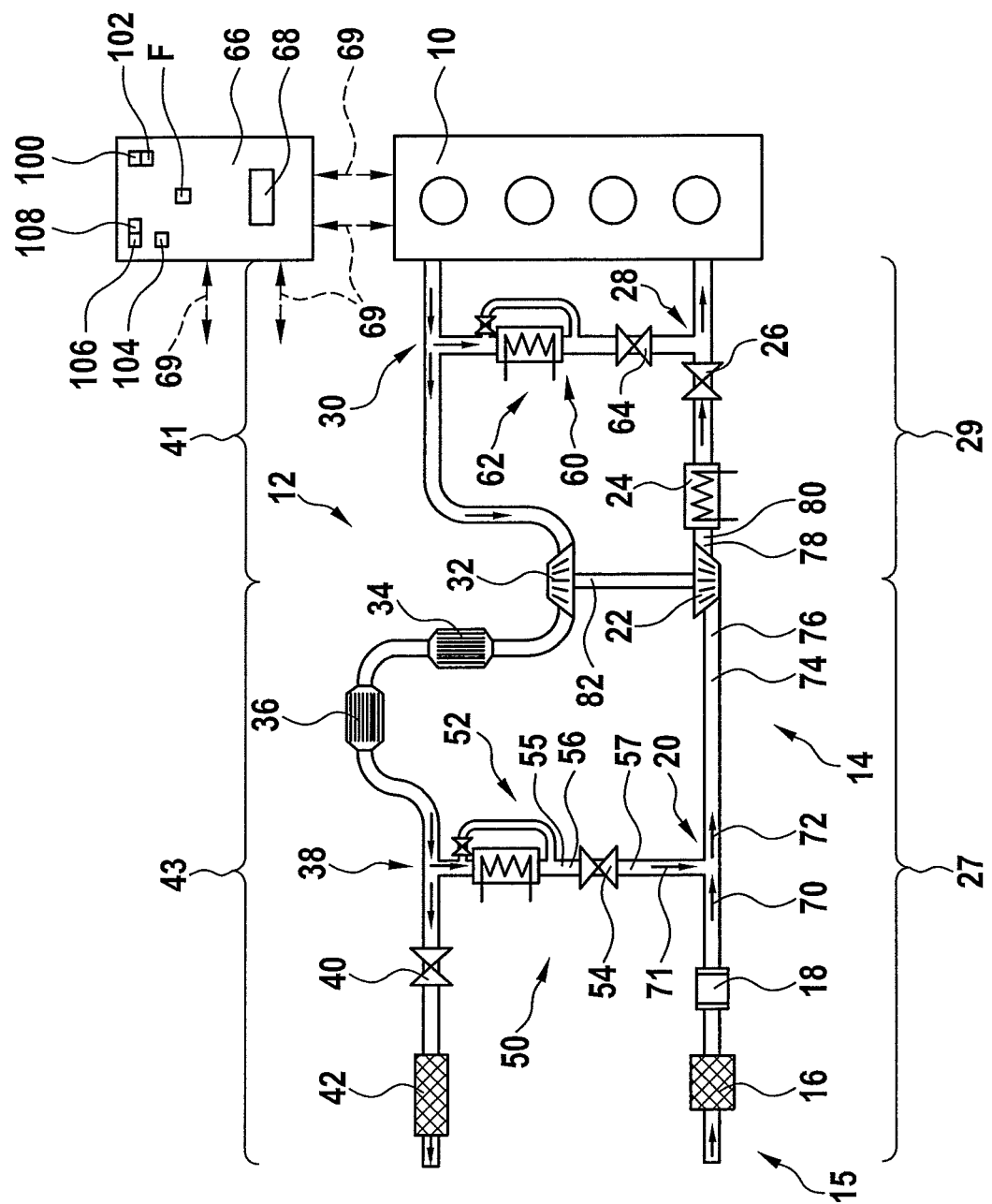

METHOD FOR DIAGNOSING A LOW PRESSURE EXHAUST GAS RECIRCULATION SYSTEM OF AN INTERNAL COMBUSTION ENGINE AND DEVICE FOR CARRYING OUT THE METHOD

RELATED APPLICATION INFORMATION

The present application claims priority to and the benefit of German patent application no. 10 2013 200 536.9, which was filed in Germany on Jan. 16, 2013, the disclosure of which is incorporated herein by reference.

FIELD OF THE INVENTION

The present invention relates to a method for diagnosing a low pressure exhaust gas recirculation system of an internal combustion engine and a device for carrying out the method according to the definition of the species in the independent claims. The subject matter of the present invention also includes a computer program and a computer program product.

BACKGROUND INFORMATION

Exhaust gas recirculation represents an important manner for lowering the nitrogen oxide emissions which are generated during the combustion of fuel in internal combustion engines. Here, a portion of the exhaust gas is recirculated into the intake chamber of the internal combustion engine. Recirculating a portion of the exhaust gas which, as an inert gas, is sluggish in reaction, reduces the generation of nitrogen oxides by lowering the peak temperatures during combustion. Normally, the exhaust gas is recirculated into the intake chamber by mixing a portion of the exhaust gas with the fresh intake air. An exhaust gas recirculation valve is provided for metering the exhaust gas. In addition to a high pressure exhaust gas recirculation system situated close to the engine, a low pressure exhaust gas recirculation system is also known in which, generally, the exhaust gas recirculation duct is implemented downstream from a diesel particle filter and upstream from a compressor.

In order to control the exhaust gas recirculation system it is necessary to record the various mass flows.

Normally, the mass flow via the low pressure exhaust gas recirculation system is modeled, the low pressure exhaust gas recirculation mass flow being determined with the aid of a so-called throttle equation, into which the pressure upstream and the pressure downstream from a low pressure exhaust gas recirculation valve, the temperature upstream from the low pressure exhaust gas recirculation valve and the geometry, i.e., the cross section of the low pressure exhaust gas recirculation valve are incorporated. The cross section of the low pressure exhaust gas recirculation valve is normally not determined directly, but is fixed, for example, with reference to the known position of the valve. An exemplary embodiment for the calculation of the mass flow with the aid of the throttle equation is described, for example in the unexamined patent application DE 10 2008 040 633 A1.

Patent application DE 10 2010 027 976 A1 describes a calculation of a low pressure mass flow, on the basis of which the mass flow flowing through the compressor and the fresh air mass flow fed to the internal combustion engine are ascertained. The low pressure mass flow is obtained by a difference formation. In this case, the low pressure mass flow flowing through the compressor is ascertained based on a model which takes into account the speed of the compressor and/or a pressure upstream from the compressor and/or a pressure downstream from the compressor and/or a temperature upstream from the compressor and/or a temperature downstream from the compressor. Corresponding calculations of the mass flow via the compressor are also described, for example, in unpublished patent application DE 198 04 330 A1 and unpublished patent application DE 101 58 250 A1.

The calculations require the fresh air mass flow fed to the internal combustion engine, which is normally measured using an air mass flow sensor situated in the intake area.

SUMMARY OF THE INVENTION

The object of the present invention is to provide a method for diagnosing a low pressure exhaust gas recirculation of an internal combustion engine and a device for carrying out the method, which makes a simple diagnosis of the low pressure exhaust gas recirculation system possible.

The object is achieved by the respective features indicated in the present disclosure.

The object of the present invention is to provide a method for diagnosing a metering unit, which meters a reagent into the exhaust gas tract of an internal combustion engine, and a device for carrying out the method, which enable a rapid diagnosis using a simple approach or manner.

The object is achieved by the respective features indicated in the description herein.

The procedure for diagnosing a low pressure exhaust gas recirculation system according to the present invention assumes that the internal combustion engine has an intake area for supplying fresh air, which includes in succession in the flow direction a first section having a low pressure in which an air mass flow sensor is situated, a compressor and a second section having a high pressure, and that the exhaust area of the internal combustion engine includes a first section having a low exhaust gas pressure, and that the low pressure exhaust gas recirculation which includes an adjustable low pressure exhaust gas recirculation valve recirculates at least a portion of the exhaust gas in the first section of the exhaust area to the first section of the intake area.

The procedure according to the present invention is distinguished by the fact that the fresh air mass flow taken in is measured by the air mass flow sensor, that the total mass flow flowing through the compressor is ascertained, that the low pressure exhaust gas recirculation is ascertained from the difference between the total mass flow and the fresh air mass flow, that an estimated value is calculated for the low pressure exhaust gas recirculation mass flow, that the difference between the ascertained low pressure exhaust gas recirculation mass flow and the estimated value is established, and that an error signal is generated if a deviation occurs which corresponds to an apparent difference.

The diagnosis of the low pressure exhaust gas recirculation system according to the present invention, based on a comparison of the low pressure exhaust gas recirculation mass flow with an estimated value for the low pressure exhaust gas mass flow, ascertained largely on the basis of measured variables, allows conclusions to be drawn about the reliability of the ascertained low pressure exhaust gas mass flow. The low pressure exhaust gas mass flow is incorporated in the decision on measures which are required for efficient exhaust gas treatment. Thus, it involves an exhaust gas-relevant variable which must be reliably ascertained in order to comply with statutory regulations.

Advantageous refinements and embodiments of the procedure for diagnosing a low pressure exhaust gas recirculation according to the present invention result from the dependent claims.

To prevent the occurrence of a comparatively small difference from immediately resulting in the provision of an error signal, it is advantageously provided that the difference is compared in a comparator to a threshold value and that the error signal is generated only if the differences [sic] exceeds a threshold value.

It may be provided that the total mass flow flowing through the compressor is ascertained using a model. The model may take into account at least one of the following variables: a speed of the compressor, a pressure upstream from the compressor, a pressure downstream from the compressor, a temperature upstream from the compressor, a temperature downstream from the compressor.

It further may be provided that the estimated value for the low pressure exhaust gas recirculation mass flow is likewise ascertained using a model. The model may take into account at least one of the following variables: the opening cross section of the low pressure exhaust gas recirculation valve, the pressure upstream from the low pressure exhaust gas recirculation valve, the pressure downstream from the low pressure exhaust gas recirculation valve, and a temperature upstream from the low pressure exhaust gas recirculation valve.

An error signal may be provided when the ascertained low pressure exhaust gas recirculation mass flow exceeds the estimated value. In this case, it may be concluded, for example, that a low pressure exhaust gas recirculation valve is stuck in the open position.

Similarly, an error signal may be provided when the estimated value exceeds the ascertained low pressure exhaust gas recirculation mass flow. In this case, it may be concluded, for example, that a low pressure exhaust gas recirculation valve is stuck in the closed position.

The device according to the present invention for carrying out the method relates initially to a specifically adapted control device which contains arrangements for carrying out the method.

The control device may include at least one electrical memory in which the method steps are saved as a control device program. The control device contains at least a determination for the low pressure exhaust gas recirculation mass flow, a unit for calculating the estimated value for the low pressure exhaust gas recirculation mass flow, a subtractor for the difference formation and a comparator for comparing the difference to a threshold value.

The computer program according to the present invention provides that all steps of the method according to the present invention are executed when it is run on a computer.

The computer program product according to the present invention having program code stored on a machine-readable medium executes the method according to the present invention when the program is run on a computer.

Exemplary embodiments of the present invention are represented in the drawing and explained in greater detail in the following description.

BRIEF DESCRIPTION OF THE DRAWING

The FIGURE shows a technical environment in which a method according to the present invention operates.

DETAILED DESCRIPTION

The FIGURE shows a schematic representation of one exemplary embodiment of an internal combustion engine 10 having an intake area 14 for supplying an air mixture and an exhaust area 12.

Intake area 14, at the entrance of which a fresh air mass flow 15 appears, includes, as viewed in the flow direction: an air filter 16, an air mass flow sensor 18, a junction 20, a compressor 22, a cooler 24, a valve 26 and a junction 28. In this configuration, the air pathway from air filter 16 up to compressor 22 denotes a first section 27 having a comparatively low pressure, and an air pathway from compressor 22 up to internal combustion engine 10 denotes a second section 29 having a comparatively high pressure.

Exhaust area 12 in the upper area of FIG. 1 includes, again when viewed in the flow direction: a junction 30, an exhaust gas turbine 32, an oxidation catalytic converter 34, a particle filter 36, a junction 38, a valve 40 and a muffler 42. In this configuration an exhaust gas pathway from internal combustion engine 10 up to exhaust gas turbine 32 denotes a first section 41 having a comparatively high pressure, and an exhaust gas pathway from exhaust gas turbine 32 up to muffler 42 denotes a second section 43 having a comparatively low pressure. It is understood that the pressure along second section 43 is reduced incrementally via exhaust gas turbine 32, oxidation catalytic converter 34 and particle filter 36, corresponding to the flow resistances occurring in these components.

Starting from second section 43 in exhaust area 12 and junction 38 situated therein, a low pressure exhaust gas recirculation 50 is provided which leads to first section 27 of intake area 14 via junction 20. Low pressure exhaust gas circulation 50 includes, if necessary, an exhaust gas recirculation cooler 50 which, if necessary, includes a bypass having a valve and, in particular, a low pressure exhaust gas recirculation valve 54, the cross section of which may be electrically adjustable.

A pressure 55 and a temperature 56 are ascertained upstream from low pressure exhaust gas recirculation valve 54. A pressure 57 is ascertained downstream from low pressure exhaust gas recirculation valve 50. A measure for the opening cross section of low pressure exhaust gas recirculation valve 54 forms a control signal not further shown for electrically adjustable low pressure exhaust gas recirculation valve 54.

Provided between junction 30 in second section 41 of exhaust area 12 and junction 28 in second section 29 [of] intake area 14 is a high pressure exhaust gas recirculations [sic] 60. High pressure exhaust gas recirculation 60 in turn includes, if necessary, an exhaust gas recirculation cooler 62 which, if necessary, has a bypass with a valve and, in particular, a high pressure exhaust gas recirculation valve 64, the cross section of which may also be electrically adjustable.

A control device 66 is present, shown schematically having a computer program 68 running on it. Arrows 69 symbolize the electrical connection of control device 66 to the components identified in the FIGURE. Control device 66 includes components not further shown, such as a detector for the low pressure exhaust gas recirculation mass flow, a unit for calculating an estimated value for the low pressure exhaust gas recirculation mass flow, a subtractor for the difference formation and a comparator for comparing the difference to a threshold value.

During operation, fresh air mass flow 15 is measured by air mass flow sensor 18.

Also ascertained is total mass flow 72 flowing via compressor 22 which equals the sum total of fresh air mass flow 15 and low pressure exhaust gas recirculation mass flow 71.

A pressure 74 and a temperature 76 are ascertained upstream from compressor 22. A pressure 78 and a temperature 80 are ascertained downstream from compressor 22. Compressor 22 is rigidly coupled to exhaust gas turbine 32 and is driven at a certain speed 82.

The values of pressure 74 and temperature 76 ascertained directly upstream from compressor 22, the values of pressure 78 and temperature 80 ascertained directly downstream from compressor 22, as well as speed 82 of compressor 22 allow a precise determination to be made of total mass flow 72 flowing via compressor 22 with the aid of the model present in control device 66. It is noted that, if necessary, not all the aforementioned variables are required for ascertaining mass flow 72 flowing via compressor 22, but that in certain circumstances a few of these variables, together with the model, are sufficient for making a sufficiently precise determination of mass flow 72.

For calculating the total mass flow flowing via compressor 22, unexamined patent applications DE 198 04 330 A1 and DE 101 58 250 A1 are noted in particular once more and to which express reference is made. Given known total mass flow 72 and fresh air mass flow 15, low pressure exhaust gas recirculation mass flow 71 may be ascertained by a simple difference formation.

For carrying out the diagnosis, an estimated value 100 for low pressure exhaust gas recirculation mass flow 71 is calculated separately from the previous ascertainments.

Estimated value 100 for low pressure exhaust gas recirculation mass flow 71 may be calculated in a unit 102 in control device 66, for example, with the aid of a so-called throttle equation, in which pressure 55 and temperature 56 upstream from low pressure exhaust gas recirculation valve 50, pressure 57 downstream from low pressure exhaust gas recirculation valve 54, the temperature upstream from low pressure exhaust gas recirculation valve 54 and the opening cross section of exhaust gas recirculation valve 54 are incorporated. At this point also, it is noted that at least one of these variables is sufficient for generating estimated value 100. The cross section of low pressure exhaust gas recirculation valve 54 is normally not directly determined, but is instead fixed, for example, based on the known position of valve 54. At this point it is noted once again that one exemplary embodiment for calculating the mass flow with the aid of the throttle equation is described, for example, in unexamined patent application DE 10 2008 040 633 A1, to which express reference is made.

The difference between estimated value 100 of [exhaust gas recirculation, sic;] low pressure exhaust gas recirculation mass flow 71 and low pressure exhaust gas recirculation mass flow 71 as ascertained in the previously described manner is ascertained in a subtractor 104 in control device 66.

A first diagnosis enables a determination that low pressure exhaust gas recirculation valve 54 is at least partially stuck open. This is the case if ascertained low pressure exhaust gas recirculation mass flow 71 exceeds estimated value 100. On the other hand, it may be concluded that low pressure exhaust gas recirculation valve 54 is stuck at least partially in a closed state if estimated value 100 exceeds ascertained low pressure exhaust gas recirculation mass flow 71.

A comparator 106 may be provided which compares the difference to a threshold value 108. Only then, when the difference exceeds threshold value 108, is error signal F output. This measure prevents any difference already resulting in error signal F from being output.

In any case, when an error is detected, an error signal F is provided in control device 66 which is displayed and/or is stored in a memory for subsequent read out. Error signal F signals an error in low pressure exhaust gas recirculation 50 which, in terms of compliance with statutory regulations for exhaust gas systems, must be corrected at the earliest opportunity.

What is claimed is:

1. A method for diagnosing a low pressure exhaust gas recirculation system of an internal combustion engine, the method comprising:

measuring, by an air mass flow sensor, a fresh air mass flow taken in by the internal combustion engine,
wherein the internal combustion engine includes: (a) an intake area to supply fresh air, the intake area including, in succession in the flow direction, a first section having a low pressure, a compressor, and a second section having a high pressure, (b) an exhaust area including a first section having a low exhaust gas pressure, and (c) a low pressure exhaust gas recirculation area including an adjustable low pressure exhaust gas recirculation valve recirculating at least a portion of the exhaust gas in the second section of the exhaust area to the first section of the intake area, and
wherein the air mass flow sensor is provided in the first section of the intake area;
ascertaining the total mass flow flowing through the compressor;
ascertaining the low pressure exhaust gas recirculation mass flow from the difference between the total mass flow and the fresh air mass flow;
determining an estimated value for the low pressure exhaust gas recirculation mass flow based on a model;
forming a difference between the ascertained low pressure exhaust gas recirculation mass flow and the estimated value; and
outputting an error signal in the event of a deviation.

2. The method of claim 1, wherein the difference is compared to a threshold value in a comparator, and wherein the error signal is output only if the threshold value is exceeded.

3. The method of claim 1, wherein the total mass flow flowing through the compressor is ascertained with the aid of a model.

4. The method of claim 3, wherein the model takes at least the following variables into account: (a) a speed of the compressor; (b) a pressure upstream from the compressor; (c) a pressure downstream from the compressor; (d) a temperature upstream from the compressor; and (e) a temperature downstream from the compressor.

5. The method of claim 1, wherein the model takes at least one of the following variables into account: (a) the opening cross section of the low pressure exhaust gas recirculation valve; (b) a pressure upstream from the low pressure exhaust gas recirculation valve; (c) a pressure downstream from the low pressure exhaust gas recirculation valve; and (d) a temperature upstream from the low pressure exhaust gas recirculation valve.

6. The method of claim 1, wherein a low pressure exhaust gas recirculation valve is perceived as stuck open if the ascertained low pressure exhaust gas recirculation mass flow exceeds the estimated value.

7. The method of claim 1, wherein a low pressure exhaust gas recirculation valve is perceived as stuck closed if the estimated value exceeds the ascertained low pressure exhaust gas recirculation mass flow.

8. A device for diagnosing a low pressure exhaust gas recirculation system of an internal combustion engine, comprising:
a control device having at least one unit for determining an estimated value for a low pressure exhaust gas recirculation mass flow, and a subtractor for determining a difference;
wherein the control device is configured for:
measuring, by an air mass flow sensor, a fresh air mass flow taken in by the internal combustion engine,
wherein the internal combustion engine includes: (a) an intake area to supply fresh air, the intake area including, in succession in the flow direction, a first section having a low pressure, a compressor, and a second section having a high pressure, (b) an exhaust area including a first section having a low exhaust gas pressure, and (c) a low pressure exhaust gas recirculation area including an adjustable low pressure exhaust gas recirculation valve recirculating at least a portion of the exhaust gas in the second section of the exhaust area to the first section of the intake area, and
wherein the air mass flow sensor is provided in the first section of the intake area;
ascertaining the total mass flow flowing through the compressor;
ascertaining the low pressure exhaust gas recirculation mass flow from the difference between the total mass flow and the fresh air mass flow;
determining an estimated value for the low pressure exhaust gas recirculation mass flow based on a model;
forming a difference, by the subtractor, between the ascertained low pressure exhaust gas recirculation mass flow and the estimated value; and
outputting an error signal in the event of a deviation.

9. The device of claim 8, wherein the difference is compared to a threshold value in a comparator, and wherein the error signal is output only if the threshold value is exceeded.

10. A non-transitory computer readable medium having a computer program, which is executable by a processor, comprising:
a program code arrangement having program code for diagnosing a low pressure exhaust gas recirculation system of an internal combustion engine, by performing the following:
measuring, by an air mass flow sensor, a fresh air mass flow taken in by the internal combustion engine,
wherein the internal combustion engine includes (a) an intake area to supply fresh air, the intake area including, in succession in the flow direction, a first section having a low pressure, a compressor, and a second section having a high pressure, (b) an exhaust area including a first section having a low exhaust gas pressure, and (c) a low pressure exhaust gas recirculation area including an adjustable low pressure exhaust gas recirculation valve recirculating at least a portion of the exhaust gas in the second section of the exhaust area to the first section of the intake area, and
wherein the air mass flow sensor is provide in the first section of the intake area;
ascertaining the total mass flow flowing through the compressor;
ascertaining the low pressure exhaust gas recirculation mass flow from the difference between the total mass flow and the fresh air mass flow;
determining an estimated value for the low pressure exhaust gas recirculation mass flow based on a model;
forming a difference between the ascertained low pressure exhaust gas recirculation mass flow and the estimated value; and
outputting an error signal in the event of a deviation.

* * * * *